UNITED STATES PATENT OFFICE.

FRITZ SINGER AND ALFRED HOLL, OF OFFENBACH-ON-THE-MAIN, GERMANY, ASSIGNORS, BY MESNE ASSIGNMENTS, TO THE CHEMICAL FOUNDATION, INC., A CORPORATION OF DELAWARE.

DERIVATIVES OF PYRAZOLE ANTHRONE YELLOW.

1,329,435.    Specification of Letters Patent.    Patented Feb. 3, 1920.

No Drawing.    Application filed September 23, 1915.    Serial No. 52,210.

*To all whom it may concern:*

Be it known that we, FRITZ SINGER and ALFRED HOLL, both citizens of the German Empire, and residents of Offenbach-on-the-Main, in the Grand Duchy of Hesse, Germany, have invented new and useful Improvements in Derivatives of Pyrazole Anthrone Yellow, of which the following is a specification.

By melting together pyrazole-anthrone of the formula

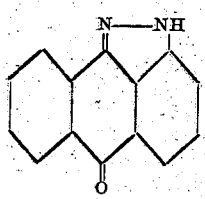

with caustic alkalis a yellow vat dyestuff is obtained, which we have called pyrazole-anthrone-yellow as described by German Patent 255,641.

Derivatives of this dyestuff are obtained by melting together suitable substitution products of pyrazole-anthrone as well as by substitution of pyrazole-anthrone-yellow itself. These dyestuffs together with pyrazole, anthrone-yellow itself we call dyestuffs of the pyrazole-anthrone-yellow-type.

We have found, that new dyestuffs of excellent fastness are obtained by introducing alkyl radicals into the dyestuffs of the type referred to hereinbefore.

The new dyestuffs are produced by treating the alkali salts of the dyestuff of the pyrazole-anthrone-yellow-type with the esters of acids, alkylhalids and other agents that are generally used for introducing alkyl radicals.

The alkali salts referred to may combine with two alkyl radicals, while the acid radical is separated by forming a salt with the metal of the alkali.

In this manner dialkylderivatives of the dyestuffs of the pyrazole-anthrone-yellow-type are obtained.

However it is possible to introduce but one alkyl radical. For this purpose it becomes necessary to select the proper agents for alkylizing or the conditions for alkylizing in a suitable manner.

Thus, monoalkyl derivatives are obtained. For example when using benzylchlorid under ordinary conditions by reason of the chemical constitution of this body, a monobenzyl derivative is obtained.

These monoalkyl derivatives, in opposition to the dialkyl derivatives, are capable of forming alkali metal salts, which latter may be further alkylized.

When for this second alkylizing process an agent is used which contains an alkyl radical different from that used in the first stage of the process, dialkyl derivatives are obtained, which contain different alkyl radicals in the same molecule.

Different alkyl radicals may be introduced into monoalkyl derivatives in which the alkyl group first introduced may not by reason of its chemical constitution be further introduced by using re-agents containing alkyl groups of lower weight in the second alkylizing process.

In this manner the ethyl- and methyl radical can be easily introduced into the monobenzyl derivative.

The non-substituted monoalkyl derivatives of the dyestuffs of the pyrazole-anthrone-yellow-type are scarlet red dyestuffs, which are insoluble in water but readily soluble in hot organic solvents of a high boiling point, from which solutions they may be recrystallized.

These bodies dissolve in an alkaline hydrosulfite solution with blue color from which solution cotton is first dyed with blue tones, which by oxidation become changed to a bright scarlet red.

The non-substituted dialkyl derivatives are red dyestuffs, which are insoluble in water as well as in hot solvents of a high boiling point; therefore they can easily be separated from the monoalkyl derivatives by boiling the bodies with solvents of a high boiling point, While the monoalkyl derivatives become colored black when treated with concentrated alkali metal hydroxids, whereby alkali metal salts are formed, the dialkyl derivatives are indifferent against the action of alkalis. The mixed dialkyl derivatives are scarcely distinguished from the normal dialkyl derivatives as regards their properties.

The non-substituted dialkyl derivatives give with an alkaline hydrosulfite solution a blue vat, by which cotton is dyed in blue shades, which upon exposure to the air are changed to bordeaux-red shades of excellent fastness.

The following examples serve to illustrate the nature of our invention and in what manner the same is to be performed. But we wish it to be understood, that our invention is not limited to these examples nor to the proportions given therein.

*Example 1.*

One part of the dyestuff described in the German Patent No. 255,641 is digested in the form of a paste with potassium lye consisting of a 50 per cent. solution of potassium hydroxid until the yellow dyestuff has been wholly transformed into the violet potassium salt, showing a copperlike brilliance. The solution is diluted with water until the percentage of potassium has become 3 to 5 per cent.; then the salt is filtered off, and dried as thoroughly as possible by means of suction.

The thus obtained paste of the potassium salt is heated to 100° C. during 3 hours in a closed vessel together with 1 to 2 parts of benzylchlorid. The brown-red reaction product is diluted with alcohol, filtered and washed with alcohol.

The dyestuff forms a red powder and dissolves in concentrated sulfuric acid with an orange color. It is easily soluble in boiling nitrobenzene and is precipitated therefrom when cooled as a red crystalline powder. When heated with alkaline hydrosolfite a pure-blue vat is formed. Cotton is dyed from this vat in blue tones which upon exposure to the air are changed into a very clear scarlet-red.

*Example 2.*

One part of the dyestuff obtained according to German Patent 255,641 is heated in the form of the potassium salt, described in Example 1, in a closed vessel during 2 hours to 100° C. together with 2 parts of the ethyl-ester of p-toluene sulfonic acid. The further treatment corresponds to that described in the first example.

The dyestuff forms a bordeaux-red powder, which dissolves in concentrated sulfuric acid with red-orange color. The dyestuff is much less easily soluble in nitrobenzene than that obtained according to Example 1.

When heated with alkaline hydrosulfite it forms a blue vat, from which cotton dyes in blue shades, which are changed upon exposure to the air into an excellent fast and intensive bordeaux-red.

The alkylizing process may also be carried out by agitating in an open vessel. Instead of the ethyl-ester, the methyl-ester, diethyl- and dimethyl-sulfate etc. may be employed.

*Example 3.—Complete ethylizing of the incompletely alkylized dyestuff obtained according to Example 2.*

The dyestuff obtained according to Example 2 is dissolved in 10 parts of sulfuric acid 66° Bé., poured into ice water and washed until the acid has been fully removed. The thus obtained paste is heated while stirring with about 4 parts of caustic potash, until the mass has become deep violet black. After cooling the mass is diluted with such a quantity of water, that a potassium lye of 5 to 10 per cent. is obtained and then filtered.

The moist alkaline residue is alkylized with the ethyl ester of p-toluene sulfonic acid, as described by Example 2. If desired the ethylizing process is repeated.

The pure diethyl derivative forms, when finely divided, a beautiful violet-red powder, which when ground shows the brilliance of brass. It is quite fast to alkali and shows weakly basic properties. The dark-red solution of the dyestuff in sulfuric acid becomes yellow-red when slowly diluted with ice, afterward pure-yellow, finally the yellow sulfate of the dyestuff is precipitated.

By further addition of water violet-red flakes of the free dyestuff are obtained.

When ground together with sulfuric acid of 60 degrees Bé. the yellow sulfate is directly obtained.

The dyestuff dissolves in organic solvents, for example in boiling nitrobenzene, sparingly with yellow-red to red color and yellow fluorescence. The fastness of the dyestuff is practically perfect.

*Example 4.—Production of the benzylethyl derivative.*

The transformation of the monobenzyl derivative, obtained according to Example 1, into the paste of the potassium salt and the ethylization of the latter with the ethyl-ester of p-toluene sulfonic acid is performed as described in Example 3.

The product is obtained free from the unaltered monobenzyl derivative by washing with hot nitrobenzene or by a repeated ethylization.

The properties of the product resemble in all respects the diethyl derivative described by Example 3.

*Example 5.—Production of the benzylmethyl derivative.*

38 parts of the benzyl derivative obtained according to Example 1 are transformed into the potassium salt.

The moist paste or the substance dried *in vacuo* is heated in an autoclave, provided with a stirring mechanism, for 1 hour to 120° C. together with 120 parts of the methylester of p-toluene sulfonic acid.

The reaction mass diluted with alcohol is filtered off, washed with water and dried.

The benzylmethyl derivative forms when dried a brown-red powder, which is soluble in concentrated sulfuric acid with orange-red color. From the blue vat cotton is dyed in blue tones, which are changed upon exposure to the air into an excellent fast red.

*Example 6.—Production of the ethyl methyl derivative.*

44 parts of the product of ethylization obtained according to Example 2, which product contains the monoethyl- and the diethyl derivative, are heated for 3 hours with 500 parts of water and 300 parts of caustic potash until the mass has become black and all the monoethyl derivative has been transformed into the potassium salt. The obtained product is filtered off and the water removed by suction.

The moist paste, or the substance preferably dried *in vacuo*, is heated for 1 hour to 120° C. together with 120 parts of the methylester of p-toluene sulfonic acid. The further treatment corresponds to that described by Example 2.

When the product of alkylization contains some unaltered monoethyl derivative, it becomes necessary to repeat the methylizing process. When completely methylized the product forms a mixture of the diethyl- and the ethyl-methyl derivative.

The dried substance forms a brown-red powder, which resembles in all its properties, the diethyl derivative described by Example 3.

*Example 7.—Production of the benzylnitro derivative.*

91 parts of the dry potassium salt of nitro derivative of pyrazole-anthrone-yellow (obtained by nitrating the dyestuff in concentrated sulfuric acid) are heated with sixty parts of benzylchlorid, while stirring, for 3 hours to 80–85° C.

The dyestuff is treated as described in the foregoing examples and forms when dried a brown-red powder, which is insoluble in water and soluble in concentrated sulfuric acid with orange color.

The dyestuff gives with alkaline hydrosulfite solution a blue vat, from which cotton dyes in blue shades, which are quickly changed upon exposure to the air into a brown-red color.

Now what we claim and desire to secure by Letters Patent is the following:

1. Process for the production of anthracene dyestuffs consisting in treating pyrazole-anthrone-yellow with alkylizing agents substantially as described.

2. Process for the production of anthracene dyestuffs consisting in transforming pyrazole-anthrone-yellow into monoalkyl derivatives by means of a partial alkylization substantially as described.

3. Process for the production of anthracene dyestuffs consisting in completely alkylizing pyrazole-anthrone-yellow by means of the same alkylizing agent substantially as described.

4. Process for the production of anthracene dyestuffs consisting in first transforming pyrazole-anthrone-yellow into the monoalkyl derivative and then further alkylizing the latter with a different alkyl radical, whereby mixed dialkyl derivatives of the said dyestuffs are obtained substantially as described.

5. The process for the production of anthracene dye stuffs comprising treating pyrazole anthrone yellow with an alkyl halogenid.

6. The process for the production of anthracene dye stuffs comprising treating pyrazole anthrone yellow with benzyl chlorid.

7. As a new article of manufacture, an alkyl substituted derivative of pyrazole anthrone yellow.

8. As new articles of manufacture the dyestuffs which are obtained by partially alkylizing pyrazole-anthrone-yellow, which dyestuffs form, when dry, red to brown powders, which are insoluble in water and diluted acids, soluble in concentrated sulfuric acid with orange color, relatively soluble in hot nitrobenzene and other organic solvents of a high boiling point, as *f. i.* nitrobenzene, with orange color, forming with alkaline hydrosulfite solution a blue vat, from which cotton dyes in blue shades, which in the case of non-substituted monoalkyl derivatives change into a clear yellowish red substantially as described.

9. As new articles of manufacture the dyestuffs, which are obtained by the complete alkylization of pyrazole-anthrone-yellow, containing two different alkyl radicals, which dyestuffs form brown red to red brown powders, insoluble in water and diluted acids, being in the absence of sulfo- and hydroxylgroups indifferent against the action of alkalis and showing weakly basic properties, the dyestuffs being soluble in concentrated sulfuric acid with dark-red color while almost insoluble in boiling solvents of a high boiling point, giving with alkaline hydrosulfite solution a blue vat, from which cotton dyes in blue shades, which change at the air in the case of non-substituted dialkyl derivatives into a blue-red to bordeaux color of excellent fastness substantially as described.

That we claim the foregoing as our invention, we have signed our names in presence of two witnesses, this first day of September, 1915.

FRITZ SINGER.
ALFRED HOLL.

Witnesses:
ANTON FEALLER,
JEAN FRICKEL.